(12) United States Patent
Ito

(10) Patent No.: US 9,028,762 B2
(45) Date of Patent: May 12, 2015

(54) WET TYPE EXHAUST GAS DESULFURIZATION APPARATUS

(75) Inventor: Motofumi Ito, New York, NY (US)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 267 days.

(21) Appl. No.: 13/561,386

(22) Filed: Jul. 30, 2012

(65) Prior Publication Data

US 2014/0030157 A1   Jan. 30, 2014

(51) Int. Cl.
| | | |
|---|---|---|
| *B01D 53/50* | (2006.01) | |
| *B01D 53/78* | (2006.01) | |
| *C02F 1/72* | (2006.01) | |
| *C02F 103/18* | (2006.01) | |

(52) U.S. Cl.
CPC .............. *B01D 53/504* (2013.01); *C02F 1/72* (2013.01); *B01D 2251/102* (2013.01); *B01D 2259/124* (2013.01); *C02F 2103/18* (2013.01); *C02F 2303/26* (2013.01)

(58) Field of Classification Search
CPC ........ B01D 53/18; B01D 53/50; B01D 53/77; B01D 53/78; B01D 53/504; C02F 1/72
USPC ............ 422/168, 224, 230, 231, 234; 96/234, 96/235
See application file for complete search history.

(56) References Cited

U.S. PATENT DOCUMENTS

| | | | | |
|---|---|---|---|---|
| 4,515,754 | A * | 5/1985 | Stehning ...................... | 422/168 |
| 5,540,760 | A * | 7/1996 | Risse et al. ...................... | 95/195 |
| 6,896,851 | B1 | 5/2005 | Onizuka et al. | |

FOREIGN PATENT DOCUMENTS

| | | |
|---|---|---|
| JP | 05-55176 A | 3/1993 |
| JP | 7-108131 A | 4/1995 |
| JP | 7-275654 A | 10/1995 |
| JP | 8-131753 A | 5/1996 |
| JP | 10-118451 A | 5/1998 |
| JP | 2002-210326 A | 7/2002 |

(Continued)

OTHER PUBLICATIONS

International Search Report of PCT/JP2013/068845, mailing date of Sep. 10, 2013.

(Continued)

*Primary Examiner* — Jill Warden
*Assistant Examiner* — Joye L. Woodard
(74) *Attorney, Agent, or Firm* — Westerman, Hattori, Daniels & Adrian, LLP

(57) ABSTRACT

A wet type exhaust gas desulfurization apparatus includes an absorption tower desulfurizing exhaust gas by causing the exhaust gas to come into gas-liquid contact with an absorbent, a spray mechanism spraying the absorbent into the tower, an oxidization mechanism provided in a bottom portion of the tower and supplying oxygen to the absorbent that accumulates inside the tower, a circulation mechanism feeding the absorbent from a discharge port formed in the bottom portion of the tower, to the spray mechanism, and a liquid ejection mechanism including a hydraulic nozzle ejecting liquid into the tower. In this apparatus, the oxidization mechanisms are provided with an interval in a horizontal direction relative to the discharge port. Furthermore, in the apparatus, the hydraulic nozzle is installed in the bottom portion of the tower and is provided at a location between the oxidization mechanism and the discharge port.

4 Claims, 2 Drawing Sheets

(56) References Cited

FOREIGN PATENT DOCUMENTS

| JP | 2002-361035 A | 12/2002 |
|---|---|---|
| JP | 3486399 B2 | 1/2004 |

OTHER PUBLICATIONS

Written Opinion of PCT/JP2013/068845, mailing date of Sep. 10, 2013.

Notification of Transmittal of Translation of the International Preliminary Report on Patentability (Chapter I or Chapter II) Form PCT/IB/338 of International Application No. PCT/JP2013/068845 mailed Feb. 12, 2015 with forms PCT/IB/373 and PCT/ISA/237. (7 pages).

* cited by examiner

WET TYPE EXHAUST GAS DESULFURIZATION APPARATUS

BACKGROUND OF THE INVENTION

1. Field of the Invention

The present invention relates to a wet type exhaust gas desulfurization apparatus; the wet type exhaust gas desulfurization apparatus can desulfurize exhaust gas by causing the exhaust gas to come into gas-liquid contact with an absorbent inside an absorption tower, and can agitate the absorbent which has accumulated inside the absorption tower.

2. Description of the Related Art

Exhaust gas generated in large combustion facilities, such as a plant, or the like, includes $SO_X$ (sulfur oxide), such as $SO_2$ (sulfur dioxide). Accordingly, it is desired to remove sulfur oxides from (i.e., to desulfurize) exhaust gas. In order to desulfurize exhaust gas, a wet type exhaust gas desulfurization apparatus has been widely used, and this wet type exhaust gas desulfurization apparatus desulfurizes exhaust gas by using an absorbent including an alkaline material, such as alkaline metal (this type of exhaust gas desulfurization apparatus will hereafter be simply referred to as a "desulfurization apparatus"). A desulfurization apparatus employs a lime gypsum method, limestone gypsum, a magnesium hydroxide method, a sodium hydroxide method, an ammonia absorption method, or the like. In particular, the limestone gypsum method is used in very many desulfurization apparatuses. In many cases, when the limestone gypsum method is employed, limestone slurry which is produced by suspending a limestone ($CaCO_3$ (calcium carbonate)) in water, is used as an absorbent. Furthermore, an absorbent having a relatively high viscosity is used in a desulfurization apparatus. For example, when limestone slurry is used as an absorbent, the concentration of limestone slurry is generally set in a range from about 10% to 30% by weight.

Typically, a desulfurization apparatus includes: a spray mechanism which sprays a supply liquid into an absorption tower; an oxidization mechanism which oxidizes the absorbent to cause exhaust gas to come into an efficient gas-liquid contact with the absorbent which has accumulated inside the absorption tower; and a circulation mechanism which circulates the absorbent within the desulfurization apparatus. With the above-described configuration, the exhaust gas is desulfurized by coming into gas-liquid contact with the absorbent that has been sprayed from the spray mechanism within the absorption tower. In addition, the absorbent that has accumulated inside the absorption tower, is oxidized by the oxidization mechanism. Furthermore, the absorbent is circulated within the desulfurization apparatus by the circulation mechanism, and therefore, is repeatedly contacted within the desulfurization apparatus.

However, if the flowability of the absorbent is low, a sorbent suspended in the absorbent may settle (this phenomenon will hereafter be referred to as "slurry precipitation"). The phenomenon of slurry precipitation may easily occur in an absorbent accumulated inside an absorption tower. In order to address this phenomenon, a conventional method agitates an absorbent accumulated inside an absorption tower. Japanese Patent No. 3170158 discloses a method using propellers, and the propellers rotate in an absorbent accumulated inside an absorption tower. The rotatable propellers agitate the absorbent. Furthermore, Japanese Patent No. 3486399 discloses an apparatus including multiple pneumatic nozzles, and the multiple pneumatic nozzles spray air to generate a vortex flow of an absorbent that has accumulated inside an absorption tower in a direction of the circumference of the absorption tower. More specifically, in the conventional apparatus, the multiple pneumatic nozzles are arranged in a slant along the direction of turn of the vortex flow. Furthermore, the pneumatic nozzles are arranged apart from one another in the direction of the circumference of the absorption tower. The vortex flow generated by the pneumatic nozzles agitates the absorbent. Note that in most desulfurization apparatuses, the propellers and the pneumatic nozzles are operated and stopped in interlock with related mechanisms, such as a spray mechanism, an oxidization mechanism, and a circulation mechanism.

SUMMARY OF THE INVENTION

However, when the absorbent is agitated by using the propellers as described above, the propellers are arranged inside the absorption tower. Therefore, it becomes necessary to provide the absorption tower with a large drive mechanism for rotationally driving the propellers. Accordingly, the inner configuration of the absorption tower may become complicated, and the absorption tower may have a small amount of interior space remaining. As a result, it may become difficult to perform maintenance operations inside the absorption tower. Accordingly, it also becomes difficult to perform maintenance operations of the desulfurization apparatus. In addition, if a large drive mechanism is provided, it becomes necessary to increase the size of the desulfurization apparatus.

Furthermore, since the concentration of the absorbent is relatively high, when the absorbent is agitated by using a vortex flow generated by using pneumatic nozzles as described above, it is necessary to supply high pressure air from the pneumatic nozzles into the absorbent to generate a vortex flow in the absorbent having a high viscosity. In addition, since air floats in the absorbent towards the liquid level, it is necessary to feed high pressure air into the absorbent to generate a vortex flow in the absorbent. To supply high pressure air to the pneumatic nozzles, it is useful to provide a mechanism that generates air pressure (hereinafter referred to as an "air pressure generation mechanism") at a location close to the absorption tower. However, since the size of an air pressure generation mechanism capable of generating high pressure air may be large, the size of the desulfurization apparatus may be large. Furthermore, in order to supply high pressure air, the air pressure generation mechanism may have a complex configuration. As a result, it becomes difficult to perform maintenance operations on the air pressure generation mechanism. Therefore, it may also become difficult to perform maintenance operations on the desulfurization apparatus.

In addition, as described above, the propellers and the pneumatic nozzles are operated and stopped in interlock with related mechanisms, such as a spray mechanism, an oxidization mechanism, and a circulation mechanism, primarily. Therefore, when the desulfurization apparatus is stopped, the circulation mechanism stops. Accordingly, the absorbent accumulated inside the absorption tower does not circulate and has no flowability. As a result, the phenomenon of slurry precipitation may occur to the absorbent that has accumulated inside the absorption tower. When the desulfurization apparatus is started in this state, the absorbent is not agitated by the propellers and the pneumatic nozzles well enough yet. Accordingly, the absorbent containing sorbent having a low concentration may circulate within the desulfurization apparatus. In addition, the sorbent settled within the absorption tower may obstruct the flow of the absorbent inside the absorption tower. More specifically, in this case, the desulfurization apparatus cannot be stably operated immediately after it is started.

Considering the circumstances described above and in order to solve the above-described problems, the present invention is directed to provide a wet type exhaust gas desulfurization apparatus that a simple configuration of a mechanism thereof is configured to agitate an absorbent, maintenance operation thereof can be easily executed, size thereof is small, and operation thereof can be stable.

In order to solve the above-described problems, according to an aspect of the present invention, a wet type exhaust gas desulfurization apparatus includes: an absorption tower configured to desulfurize exhaust gas by causing the exhaust gas to come into gas-liquid contact with an absorbent; a spray mechanism configured to spray the absorbent into the absorption tower; an oxidization mechanism which is provided in a bottom portion of the absorption tower and is configured to supply oxygen to the absorbent accumulating inside the absorption tower; and a circulation mechanism configured to feed the absorbent from a discharge port, which is formed in the bottom portion of the absorption tower, to the spray mechanism, and a liquid ejection mechanism including a hydraulic nozzle configured to eject liquid into the absorption tower. In the wet type exhaust gas desulfurization apparatus, multiple oxidization mechanisms are arranged apart from one another in a horizontal direction relative to the discharge port of the absorption tower. In addition, in the wet type exhaust gas desulfurization apparatus, the hydraulic nozzle is installed in the bottom portion of the absorption tower and is provided at a location between the oxidization mechanism and the discharge port of the absorption tower.

According to an aspect of the present invention, in the wet type exhaust gas desulfurization apparatus, the hydraulic nozzle is arranged at a location closer to the discharge port from a center, in a horizontal direction, between the oxidization mechanism and the discharge port of the absorption tower.

According to an aspect of the present invention, in the wet type exhaust gas desulfurization apparatus, the liquid ejection mechanism is configured to supply liquid lifted from outside the absorption tower to the hydraulic nozzle in a condition in which a pressure applied to the liquid by the lifting is maintained.

According to an aspect of the present invention, in the wet type exhaust gas desulfurization apparatus, the liquid ejection mechanism is configured to be capable of being started and stopped separately and independently from the spray mechanism, the oxidization mechanism, and the circulation mechanism.

According to the present invention, the configuration of a mechanism for agitating an absorbent can be simplified. In addition, according to the present invention, a maintenance operation of a wet type exhaust gas desulfurization apparatus can be easily executed. Furthermore, according to the present invention, a small-size wet type exhaust gas desulfurization apparatus can be implemented, and the wet type exhaust gas desulfurization apparatus can be stably operated.

One skilled in the art may have greater understanding of the purpose of the present invention described above, other purposes of the present invention other than that described above, embodiments of the present invention, and the effect of the present invention by referring to the following detailed description of the present invention described with reference to the attached drawings.

DESCRIPTION OF THE EMBODIMENTS

A wet type exhaust gas desulfurization apparatus (hereinafter simply referred to as a "desulfurization apparatus") according to a preferred embodiment of the present invention will be described below with reference to the attached drawings.

Figure 1:
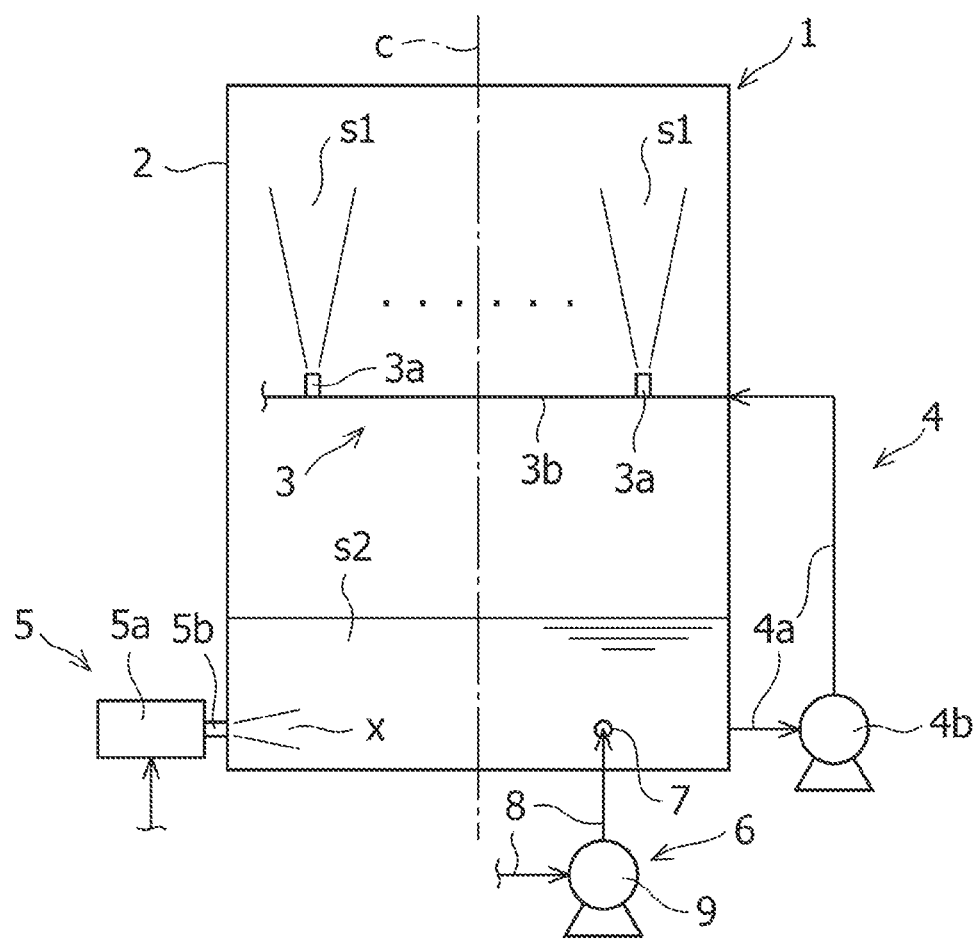
FIG. 1 is a front view schematically showing a wet type exhaust gas desulfurization apparatus according to a preferred embodiment of the present invention.
Figure 2:
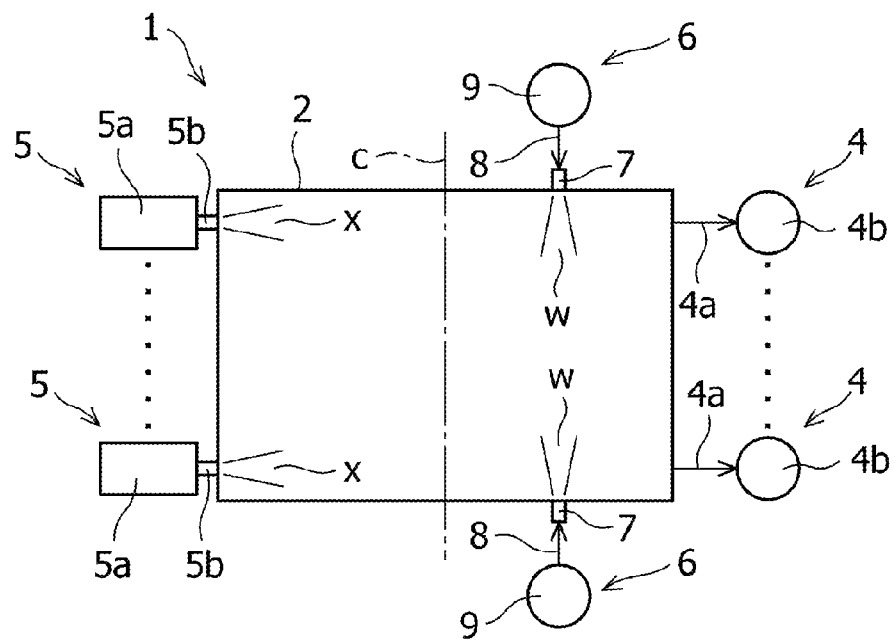
FIG. 2 is a cross section view schematically showing a bottom and peripheral portions of an absorption tower according to a preferred embodiment of the present invention.

Referring to FIGS. 1 and 2, a desulfurization apparatus 1 includes an absorption tower 2, and the absorption tower 2 is hollow and has a substantially box-like shape. Although not described in the drawings, exhaust gas containing sulfur oxides ($SO_X$), such as sulfur dioxide ($SO_2$), is fed into the absorption tower 2. Furthermore, after being fed into the absorption tower 2, the exhaust gas is desulfurized by using an absorbent, and then the desulfurized exhaust gas is discharged to the outside of the absorption tower 2. Note that the desulfurization apparatus 1 according to the present preferred embodiment of the present invention employs the limestone gypsum method. In the present preferred embodiment, limestone slurry that uses limestone (calcium carbonate ($CaCO_3$)) is used as the absorbent.

Figure 3:
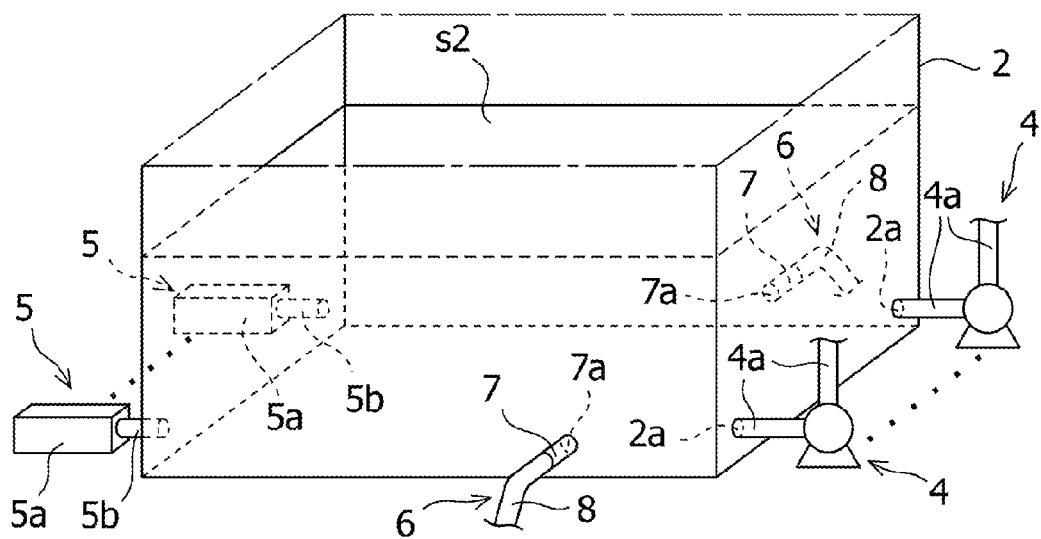
FIG. 3 is a perspective view that briefly shows the bottom and peripheral portions of an absorption tower according to a preferred embodiment of the present invention.

Referring to FIG. 1, the desulfurization apparatus 1 includes a spray mechanism 3, and the spray mechanism 3 is configured to spray the absorbent into the absorption tower 2. The spray mechanism 3 includes multiple spray nozzles 3a. To the spray nozzles 3a, a header tube 3b is connected. With this configuration, absorbent s1 is fed from the header tube 3b into the spray nozzles 3a. After being sprayed into the absorption tower 2, the absorbent s1 accumulates on the bottom portion of the absorption tower 2 (refer to FIG. 1 for accumulated absorbent s2). As shown in FIGS. 1 to 3, in order to use the absorbent s2 which is accumulated in the above-described manner in desulfurizing exhaust gas inside the absorption tower 2, the desulfurization apparatus 1 includes multiple circulation mechanisms 4, and the multiple circulation mechanisms 4 are configured to feed the absorbent s2 which is accumulated in the bottom portion of the absorption tower 2, from a discharge port 2a (FIG. 3) which is provided to the absorption tower 2 on the bottom portion thereof, to the header tube 3b which is positioned on an upstream of the spray nozzles 3a in the direction of the flow of the absorbent (hereinafter simply referred to as "upstream (side)" (of the spray nozzles 3a in the flow of the absorbent). In addition, the desulfurization apparatus 1 includes multiple oxidization mechanisms 5, and the multiple oxidization mechanisms 5 are configured to supply oxygen to the absorbent s2 accumulated inside the absorption tower 2 (refer to FIGS. 1 and 2 for supplied oxygen x). In addition, the desulfurization apparatus 1 includes a pair of liquid ejection mechanisms 6, and the pair of the liquid ejection mechanism 6 is configured to eject liquid onto the absorbent s2 which has accumulated inside the absorption tower 2 (refer to FIGS. 1 and 2 for ejected water w). More specifically, the liquid ejected by the liquid ejection mechanism 6 is water. Note here that the spray mechanism 3, the circulation mechanism 4, and the oxidization mechanism 5 are configured to be started and stopped in interlock with one another. On the other hand, the liquid ejection mechanism 6 can be started and stopped separately and independently from the spray mechanism 3, the circulation mechanism 4, and the oxidization mechanism 5.

Now, the spray mechanism 3 and the circulation mechanism 4 will be described in detail below with reference to FIGS. 1 to 3. Referring to FIG. 1, each of the multiple spray nozzles 3a in the spray mechanism 3 are arranged apart from one another in the direction of the flow of the absorbent flowing in the header tube 3b. As to the direction of spraying the absorbent from the spray nozzles 3a, the spray nozzles 3a spray the absorbent upwards in the desulfurization apparatus 1. The header tube 3b is formed to extend in the horizontal direction of the desulfurization apparatus 1. Referring to FIGS. 1 to 3, the desulfurization apparatus 1 includes a circulation tube 4a. The circulation tube 4a connects the absorption tower 2 and the header tube 3b in the bottom portion of the absorption tower 2 and on an upstream end of the header tube 3b. To the circulation tube 4a, a circulation pump 4b is installed. The absorbent s2 which has accumulated in the bottom portion of the absorption tower 2, is lifted by the circulation pump 4b and then is fed from the discharge port 2a of the absorption tower 2 (refer to FIG. 3) to the upstream edge of the header tube 3b through the circulation tube 4a.

Now, the oxidization mechanism 5 will be described in detail below with reference to FIGS. 1 to 3. The oxidization mechanism 5 is installed to the absorption tower 2 on the side surface of the absorption tower 2 in the bottom portion thereof. The oxidization mechanism 5 is provided with a gap from the discharge port 2a of the absorption tower 2 in the horizontal direction and is provided at an opposing location against the discharge port 2a. The oxidization mechanism 5 includes an oxygen supply tube 5b, and the oxygen supply tube 5b extends from an oxidization mechanism main body 5a towards the inside of the absorption tower 2. The oxygen x is supplied from the oxidization mechanism main body 5a of the oxidization mechanism 5 to the absorbent s2 which has accumulated inside the absorption tower 2, via the oxygen supply tube 5b.

The liquid ejection mechanism 6 will be described in detail below with reference to FIGS. 1 to 3. The liquid ejection mechanism 6 includes a hydraulic nozzle 7, and the hydraulic nozzle 7 is configured to eject water w into the absorption tower 2. Referring to FIG. 3, the hydraulic nozzle 7 includes a liquid ejection port 7a, and the liquid ejection port 7a has a substantially circular shape. Water supplied to the hydraulic nozzle 7 is fed into the absorption tower 2 via the liquid ejection port 7a. A pair of the hydraulic nozzles 7 is installed to the absorption tower 2 on the mutually opposing side surfaces in the bottom portion of the absorption tower 2. The liquid ejection ports 7a of the pair of the hydraulic nozzles 7 are provided at mutually opposing locations. In addition, the pair of the hydraulic nozzle 7 is arranged at a location closer to the discharge port 2a from a center C (FIG. 2), in a horizontal direction, between a group of discharge ports 2a of the absorption tower 2 and a group of the oxidization mechanisms 5. Furthermore, the liquid ejection mechanism 6 includes a liquid supply tube 8, and the liquid supply tube 8 is configured to feed water to the hydraulic nozzle 7 from outside the absorption tower 2. A liquid supply pump 9 is provided to the liquid supply tube 8. After being lifted by the liquid supply pump 9 with a predetermined pressure, the water is fed to the hydraulic nozzle 7 via the liquid supply tube 8 from outside the absorption tower 2 with the pressure that is applied by the lifting by the liquid supply pump 9, being maintained.

Now, a method for using the desulfurization apparatus 1 according to the present preferred embodiment of the present invention will be described in detail below.

At the start up of the operation, the absorbent s2 that has accumulated in the bottom portion of the absorption tower 2, is lifted by the pump 4b of the circulation mechanism 4. Accordingly, the absorbent s2 is then fed to the upstream side edge of the header tube 3b of the spray mechanism 3 via the circulation tube 4a. The absorbent fed to the header tube 3b is then fed to the spray nozzle 3a, and the spray nozzle 3a sprays the absorbent inside the absorption tower 2. The sprayed absorbent s1 reacts with the exhaust gas that has been fed into the absorption tower 2, and the sprayed absorbent s1 absorbs sulfur oxides contained in the exhaust gas. Subsequently, the sprayed absorbent s1 falls and accumulates on the bottom portion of the absorption tower 2. The absorbent s2 that has accumulated in the bottom portion of the absorption tower 2, is lifted by the pump 4b of the circulation mechanism 4, and is then fed to the upstream side edge of the header tube 3b via the circulation tube 4a again so as to be used in the desulfurization of the exhaust gas. More specifically, the absorbent can circulate through a path through which the absorbent is fed in the order of the absorption tower 2, the circulation tube 4a, the header tube 3b, the spray nozzles 3a, and the absorption tower 2. In the oxidization mechanism 5, oxygen x is supplied from the oxygen supply tube (port) 5b to the absorbent s2 which has accumulated in the bottom portion of the absorption tower 2, so as to oxidize the absorbent s2 which has accumulated in the bottom portion of the absorption tower 2.

Now, a method for agitating the absorbent s2 which has accumulated inside the absorption tower 2 of the desulfurization apparatus 1 according to the present preferred embodiment will be described in detail below.

At the start up of the operation, the liquid ejection mechanism 6 is started, and then the liquid supply pump 9 lifts water from outside the absorption tower 2 with a predetermined pressure. After being lifted by the liquid supply pump 9, the water is fed from outside the absorption tower 2 to the hydraulic nozzle 7 via the liquid supply tube 8 with the pressure that is applied by the lifting by the liquid supply pump 9, being maintained. After being fed to the hydraulic nozzle 7, the water w is ejected onto the absorbent s2 that has accumulated inside the absorption tower 2, via the fluid supply (ejection) port 7a of the hydraulic nozzle 7. The water w that is ejected from the hydraulic nozzle 7 causes the absorbent s2 that has accumulated inside the absorption tower 2, to flow in a vortex. When the absorbent s2 which has accumulated inside the absorption tower 2, flows in a vortex, the absorbent s2 that has accumulated inside the absorption tower 2, is agitated. Accordingly, if a sorbent suspended within the absorbent s2 that has accumulated inside the absorption tower 2 settles (this phenomenon will hereinafter be referred to as "slurry precipitation"), the vortex flow of the absorbent causes the settled sorbent to be crushed into fine particles mainly in a portion between the discharge port 2a of the absorption tower 2 and the oxidization mechanism 5.

As described above, in the desulfurization apparatus 1 according to the present preferred embodiment of the present invention, the water w which is ejected from the hydraulic nozzle 7, causes the absorbent s2 which has accumulated inside the absorption tower 2, to flow in a vortex. When the absorbent s2 which has accumulated inside the absorption tower 2, flows in a vortex, the absorbent s2 that has accumulated inside the absorption tower 2, is agitated. Therefore, if the phenomenon of slurry precipitation occurs, the vortex flow of the water w which is ejected from the hydraulic nozzle 7, causes the settled sorbent to be crushed into fine particles mainly in a portion between the discharge port 2a of the absorption tower 2 and the oxidization mechanism 5. Accordingly, the absorbent is well agitated between the discharge port 2a of the absorption tower 2 and the oxidization mechanism 5 in particular. As a result, at the same time when the circulation mechanism 4 is started, the oxygen fed from the oxidization mechanism 5 is further fed to the absorbent that has been efficiently agitated between the discharge port 2a of the absorption tower 2 and the oxidization mechanism 5. Accordingly, the absorbent that has accumulated inside the absorption tower 2, can be immediately oxidized. Subsequently, the absorbent that has been efficiently agitated and oxidized, is fed to the discharge port 2a of the absorption tower 2, and circulates within the desulfurization apparatus 1. Accordingly, the desulfurization apparatus 1 can be stably operated.

The present preferred embodiment has a simple configuration of ejecting the water w from the hydraulic nozzle 7 into the absorbent as the configuration of the method for agitating the absorbent. Accordingly, the configuration of the mechanism for agitating the absorbent can be simplified. In addition, the mechanism for agitating the absorbent does not occupy the inner space of the absorption tower 2. Accordingly, a large space can be secured inside the absorption tower 2. As a result, a maintenance operation of the inside of the absorption tower 2 can be easily executed. Accordingly, the maintenance operation of the desulfurization apparatus 1 can be easily carried out. Furthermore, the size of the desulfurization apparatus 1 can be small.

The specific gravity of the water w ejected from the hydraulic nozzle 7 is higher than the specific gravity of air used in the conventional method. Accordingly, the water w ejected from the hydraulic nozzle 7 can be easily supplied into the absorbent in the horizontal direction. Therefore, the water w can be ejected from the hydraulic nozzle 7 with a pressure lower than the pressure applied to air in the conventional method. In addition, the present preferred embodiment can agitate the absorbent sufficiently well by the effect of the vortex flow of the absorbent.

In the desulfurization apparatus 1 according to the present preferred embodiment of the present invention, the hydraulic nozzle 7 is provided at a location closer to the discharge port 2a from a center C (FIG. 2), in a horizontal direction, between the discharge port 2a of the absorption tower 2 and the oxidization mechanism 5. Therefore, the settled sorbent can be efficiently crushed into fine particles around the discharge port 2a of the absorption tower 2, the discharge port 2a of the absorption tower 2 being the path for circulating the absorbent. Accordingly, otherwise possible clogging of the settled sorbent over the path for the absorbent can be prevented. As a result, the desulfurization apparatus 1 can be stably operated.

In the desulfurization apparatus 1 according to the present preferred embodiment of the present invention, the liquid ejection mechanism 6 is configured to supply the water lifted from outside the absorption tower 2 to the hydraulic nozzle 7 in a condition in which the pressure applied by the lifting is maintained. Accordingly, the mechanism for feeding water to the hydraulic nozzle 7, such as the liquid supply tube 8 or the liquid supply pump 9, can be simplified. Therefore, the configuration of the mechanism for agitating the absorbent can be simplified.

In addition, in the desulfurization apparatus 1 according to the present preferred embodiment of the present invention, the liquid ejection mechanism 6 can be started and stopped separately and independently from the spray mechanism 3, the circulation mechanism 4, and the oxidization mechanism 5. Therefore, for example, the liquid ejection mechanism 6 is started and is operated before starting the spray mechanism 3, the circulation mechanism 4, and the oxidization mechanism 5, which are main component mechanisms of the desulfurization apparatus 1, so that the desulfurization apparatus 1 can be stably operated immediately after the spray mechanism 3, the circulation mechanism 4, and the oxidization mechanism 5 are started by suppressing the phenomenon of the slurry precipitation.

The present preferred embodiment of the present invention is described above. However, the present invention is not limited to the above-described preferred embodiment. More specifically, various modifications and alterations can implement the present invention on the basis of the technical ideas of the present invention.

For example, as a first modification of the present invention, slurry that uses slaked lime (calcium hydroxide ($Ca(OH)_2$)) or dolomite as the sorbent can be used as the absorbent. The desulfurization apparatus 1 can employ the magnesium hydroxide method. In this case, it is useful to use, as the absorbent, slurry that uses magnesium hydroxide or the like as the sorbent. The desulfurization apparatus 1 can employ the sodium hydroxide method. In this case, it is useful to use, as the absorbent, slurry that uses sodium hydroxide, sodium sulfate, or the like as the sorbent. The desulfurization apparatus 1 can employ the ammonia absorption method. In this case, it is useful to use, as the absorbent, slurry that uses ammonia or the like as the sorbent.

As a second modification of the present invention, the spray nozzles 3a can spray the absorbent downwards, in the horizontal direction, or in a slanting direction.

As a third modification of the present invention, the header tube 3b can include a bent portion, a warped portion, a portion extending in the vertical direction, or an inclined portion.

As a fourth modification of the present invention, the absorption tower 2 can have a substantially cylinder-like shape, a substantially cone-like shape, a substantially cylindroid-like shape, a substantially elliptic cone-like shape, or a substantially polygonal pyramid-like shape.

As a fifth modification of the present invention, liquid other than water can be ejected from the hydraulic nozzle 7. More specifically, the hydraulic nozzle 7 can eject liquid of the same type as the absorbent, or liquid of the same type as the liquid before the sorbent is suspended in the absorbent.

As a sixth modification of the present invention, one or more liquid ejection mechanisms 6 can be installed to the absorption tower 2 on one of the mutually opposing sides of the absorption tower 2 in the bottom portion of the absorption tower 2.

As a seventh modification of the present invention, multiple pairs of the liquid ejection mechanisms 6 can be provided.

As an eighth modification of the present invention, the liquid ejection port 7a of the hydraulic nozzle 7 can have a substantially semicircular shape, a substantially ellipse-like shape, a substantially semiellipse-like shape, a substantially polygonal shape, or a substantially star-like shape.

As a ninth modification of the present invention, the liquid ejection ports 7a of the pair of the hydraulic nozzle 7 can be provided with an offset in the vertical, horizontal, and/or the peripheral direction of the absorption tower 2.

As a tenth modification of the present invention, liquid can naturally fall from the liquid ejection mechanism 6 at liquid supply positions which are set with intervals taken in the vertical direction of the absorption tower 2, onto the liquid level of the absorbent s2 which has accumulated in the bottom portion of the absorption tower 2, so that the absorbent s2 which has accumulated in the bottom portion of the absorption tower 2, can be agitated. More specifically, it is useful to set the liquid supply positions being set with sufficient intervals in the vertical direction of the absorption tower 2 relative to the liquid level of the absorbent s2 which has accumulated in the bottom portion of the absorption tower 2 in order to efficiently agitate the absorbent s2 which has accumulated in the bottom portion of the absorption tower 2.

What is claimed is:

1. A wet type exhaust gas desulfurization apparatus comprising:
    an absorption tower configured to desulfurize exhaust gas by causing the exhaust gas to come into gas-liquid contact with an absorbent;
    a spray mechanism configured to spray the absorbent into the absorption tower;
    an oxidization mechanism that is provided in a bottom portion of the absorption tower and is configured to supply oxygen to absorbent accumulating inside the absorption tower;
    a circulation mechanism configured to feed the absorbent from a discharge port, which is formed in the bottom portion of the absorption tower, to the spray mechanism; and
    a pair of liquid ejection mechanisms including a pair of hydraulic nozzles configured to eject liquid into the absorption tower respectively;
    wherein multiple oxidization mechanisms are arranged apart from one another in a horizontal direction relative to the discharge port of the absorption tower; and
    wherein the pair of hydraulic nozzles is installed to mutually opposing side surfaces in the bottom portion of the absorption tower respectively such that liquid ejection ports of the pair of the hydraulic nozzles are provided at mutually opposing locations between the oxidation mechanism and the discharge port of the absorption tower.

2. The wet type exhaust gas desulfurization apparatus according to claim 1, wherein
    each hydraulic nozzle is arranged at a location closer to the discharge port than to the oxidization mechanism, in a horizontal direction, between the oxidization mechanism and the discharge port of the absorption tower.

3. The wet type exhaust gas desulfurization apparatus according to claim 1, wherein
    each liquid ejection mechanism includes a liquid supply tube configured to feed liquid to the respective hydraulic nozzle, and a liquid supply pump attached to the liquid supply tube, and
    each liquid ejection mechanism is configured such that the liquid lifted by the liquid supply pump, is fed to the respective hydraulic nozzle via the liquid supply tube from outside the absorption tower.

4. The wet type exhaust gas desulfurization apparatus according to claim 3, wherein
    the liquid ejection mechanism is configured to start and stop separately and independently from the spray mechanism, the oxidization mechanism, and the circulation mechanism.

* * * * *